(12) United States Patent
Bougaev et al.

(10) Patent No.: US 8,648,690 B2
(45) Date of Patent: Feb. 11, 2014

(54) SYSTEM AND METHOD FOR MONITORING COMPUTER SERVERS AND NETWORK APPLIANCES

(75) Inventors: Anton Bougaev, La Jolla, CA (US); Aleksey Urmanov, La Jolla, CA (US); James Britton, El Paso, TX (US)

(73) Assignee: Oracle International Corporation, Redwood City, CA (US)

( * ) Notice: Subject to any disclaimer, the term of this patent is extended or adjusted under 35 U.S.C. 154(b) by 780 days.

(21) Appl. No.: 12/841,239

(22) Filed: Jul. 22, 2010

(65) Prior Publication Data

US 2012/0019351 A1    Jan. 26, 2012

(51) Int. Cl.
*G05B 23/02* (2006.01)

(52) U.S. Cl.
USPC ............. 340/3.5; 340/3.1; 340/870.01; 710/8

(58) Field of Classification Search
USPC .......................................................... 340/3.5
See application file for complete search history.

(56) References Cited

U.S. PATENT DOCUMENTS

| | | | |
|---|---|---|---|
| 2003/0115397 A1* | 6/2003 | Hawkins et al. | 710/305 |
| 2004/0228063 A1* | 11/2004 | Hawkins et al. | 361/115 |
| 2007/0055793 A1* | 3/2007 | Huang et al. | 710/8 |

OTHER PUBLICATIONS

Intel Remote Management Module 2 User Guide, Order No. E27084-001, 2007.*
Sun Netra CT 900 Server Software Developer's Guide, Appendix H—Sun Netra CP3060 Board Sensor Map and Fault Isolation, printed from http://docs/sun.com/source/819-1179-14/appendix-cp3060-sensors.html on Jun. 4, 2010.
R. Smith, et al. Enabling Java for Small Wireless Devices with Squawk and Spot World, printed from http://www.ics.uci.edu.lopes/bspc05/papers/smith.pdf on Jun. 4, 2010.
Intel Sensor Board, Data Sheet, Rev. 1.02 printed from www.ics.uci.edu/~lopes/bspc05/papers/smith.pdf on Jun. 4, 2010.
A. Woo, The Mica Sensing Platform, Jan. 15, 2002, NEST retreat, printed from http://webs.cs.berkeley.edu/retreat-1-02/micasb.ppt on Jun. 4, 2010.
Make your Creations Come to Life! PicoBoard—Sensor Board that works with MIT's Scratch, printed from http://www.picocricket.com/picoboard.html on Jun. 4, 2010.
B. Horan, Sun Small Programmable Object Technology (SPOT), Copyright Sun Microsystems 2008, printed on Jun. 4, 2010.
Ubiquitous Sensor Portals, printed from http://www.media.mit.edu/resenv/portals/on Jun. 4, 2010.

* cited by examiner

*Primary Examiner* — Daniel Wu
*Assistant Examiner* — Frederick Ott
(74) *Attorney, Agent, or Firm* — Brooks Kushman P.C.

(57) ABSTRACT

A sensor board includes at least one sensor in communication with a controller having a single board address to facilitate sensor polling by standard, product-independent modules of a circuit board for a computer server or network appliance. Miniature low-cost sensor boards can be placed in multiple locations on circuit boards without the necessity of being specified and integrated into the circuit board during the design phase to reduce or eliminate associated design risks or delays.

16 Claims, 2 Drawing Sheets

SYSTEM AND METHOD FOR MONITORING COMPUTER SERVERS AND NETWORK APPLIANCES

BACKGROUND

1. Field

Embodiments of the present disclosure relate to a system and method for standardized monitoring of one or more operating conditions of computer servers and network appliances.

2. Background Art

Various types of sensors are provided for monitoring of environmental and operating conditions for computer servers and network appliances, such as enclosure intrusion, temperature, vibration, and airflow, for example. The number, type, and position of the sensors are often specified during design of the server and/or one or more circuit boards, each of which may include one or more processors, memory, related chipsets, and electronic components, for example. Each sensor must communicate information relating to a sensed or measured parameter to a controller or processor to determine whether the system is operating as expected and/or to provide information to a local or remotely situated device administrator. Sensors may include, but are not limited to, thermal, humidity, vibration, altitude, acoustic noise, airflow, and electrical parameter sensors. One or more sensors mounted on a motherboard may provide information relative to operating characteristics within a particular area or zone of the motherboard. For example, the operating temperature(s) may be used to control system operation, such as adjusting airflow or processor speed, to provide a status or warning message relative to operating temperature, or to shutdown the system to protect components from damage due to overheating, for example.

Various standard protocols, such as I2C (or $I^2C$) and SMBus, for example, may be used to communicate control, diagnostic, and power management data between integrated circuit chips, which may include a microcontroller or microprocessor. The I2C and SMBus protocols are popular 2-wire buses (plus a ground connection) that include many similarities and are generally compatible with respect to devices designated as slave or master devices. As one example of operating characteristics, the I2C protocol developed by Phillips Semiconductors provides for serial communication of data between I2C integrated circuit devices using two conductors to implement an I2C bus. A serial data line and a serial clock line are provided with each device connected to the bus being addressable by a unique address. Similar to other protocols, the I2C protocol provides various multi-master bus features, such as collision detection and arbitration, to prevent data corruption when more than one master simultaneously initiates a data transfer.

Computer servers and network appliances may include multiple sensors on a single circuit board, and multiple circuit boards in a particular enclosure, rack, or other arrangement. Because the 2-wire serial bus protocols, and similar protocols, provide relatively low bandwidth for communicating information to the processor or controller, it may take several minutes for the controller to receive updated information from a particular sensor. Likewise, much of the information that could be provided by sensors sampling at frequencies ranging between 10-100 Hz, for example, can not be used due to the bandwidth constraints of the serial data bus.

SUMMARY

A system and method for monitoring operating conditions of a computer server or network appliance include at least one sensor in communication with a sensor controller having a single address on a corresponding service bus for communication with a microprocessor of the server or network appliance. In one embodiment, a plurality of sensors and a sensor controller are mounted on a sensor circuit board. The sensors communicate data to the sensor controller, which operates as a master or slave device on a corresponding standard-protocol service bus with a single bus address, to process the data and communicate corresponding information to a main processor via the service bus. The sensor circuit board may be connected to a main circuit board via a corresponding board-to-board connector, which may also provide physical support for the sensor circuit board. Alternatively, the sensor circuit board may be hard-wired or soldered to the main circuit board. Each main circuit board may include one or more sensor boards to monitor operating conditions at different locations within a multi-board chassis, rack, or enclosure.

The present disclosure includes embodiments having various advantages. For example, various embodiments create a layer of hardware abstraction by providing an intermediate microcontroller or processor to process raw sensor data and provide a single bus address for communicating raw or processed data from one or more sensors. Similarly, use of a single bus address for multiple sensors may increase overall sensor data availability to the main processor by reducing latency and overhead associated with collisions and arbitration of multiple master devices attempting to communicate on a narrow bandwidth service bus. Use of a standard protocol and board connector allows the sensor board to be mounted in various locations on a particular circuit board, or on one or more boards of a multi-board application. A standard protocol and connector also facilitates modular development of the sensor circuit board independent of the development cycle of the primary circuit boards used in the server or network appliance.

The above advantages and other advantages and features will be readily apparent from the following detailed description of the preferred embodiments when taken in connection with the accompanying drawings.

BRIEF DESCRIPTION OF THE DRAWINGS

Embodiments of the present disclosure described herein are recited with particularity in the appended claims. However, other features will become more apparent, and the embodiments may be best understood, by referring to the following detailed description in conjunction with the accompanying drawings, in which:

DETAILED DESCRIPTION

As those of ordinary skill in the art will understand, various features of the embodiments illustrated and described with reference to any one of the Figures may be combined with features illustrated in one or more other Figures to produce embodiments that may not be explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a main or primary circuit board for a computer server or network or storage appliance having at least one sensor circuit board with at least one sensor and an associated microcontroller communicating with a processor on the primary circuit board via a service or signaling bus. Although a single main circuit board is illustrated, many applications will include more than one main circuit board in a chassis, rack, or enclosure. Each board may include one or more locations for sensor boards that may be selectively utilized for particular implementations. Of course, those of ordinary skill in the art may recognize similar applications or implementations consistent with the teachings of the present disclosure although not specifically illustrated or described.

Figure 1:
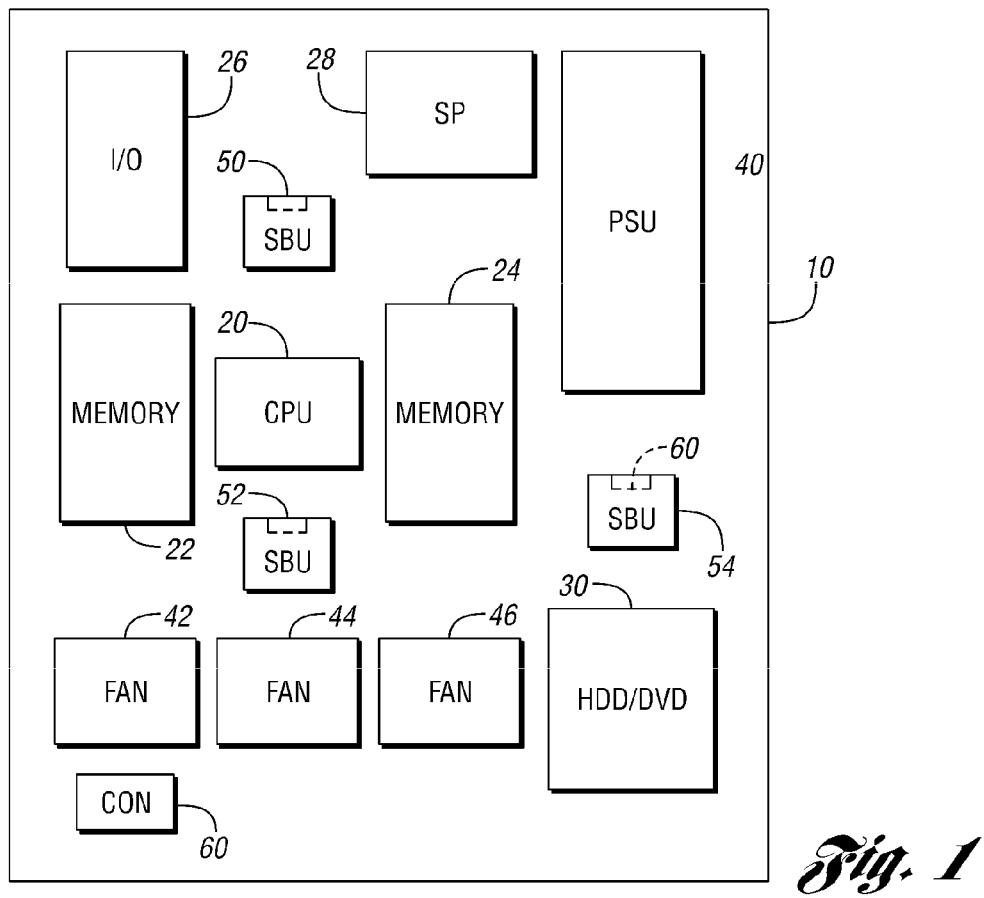
FIG. 1 is a block diagram illustrating a primary circuit board with one or more sensor boards according to embodiments of the present disclosure.

FIG. 1 is a block diagram illustrating a representative embodiment of a system or method for monitoring operating conditions of a computer system including at least one primary or main circuit board according to the present disclosure. A computer system, such as a server or network appliance, may include one or more primary or main circuit boards represented generally by circuit board 10. Circuit board 10 represents any of a number of circuit boards that may also be referred to as a motherboard, center-plane board, disk backplane board, etc. Circuit board 10 may include a microprocessor or central processing unit (CPU) 20 in communication with memory 22, 24 and various input/output (I/O) support chips as generally represented by block 26 via a system bus that provides multiple conductors to facilitate data communication and provide power to the various components from an associated power supply unit (PSU) 40. Circuit board 10 may also include an SP 28 and one or more storage devices, such as a hard disk drive (HDD) and or digital video disk (DVD) drive 30 in communication with CPU 20. On or more fans 42, 44, 46 may also be mounted on circuit board 10 and powered by PSU 40 to provide system cooling.

As illustrated in FIG. 1, a representative computer system may include several main circuit boards 10, with one or more of the main circuit boards 10 including one or more modular sensor boards (SBU) 50, 52, 54 positioned at various locations and secured to circuit board 10 via corresponding connectors 60. Depending on the particular application and implementation, each SBU 50, 52, 54 may be identically configured, or may have different sensors. Similarly, identically configured sensor boards having the same sensor data available may not use all available sensors. For example, identically configured sensor boards 50, 52, 54 may each have a temperature, humidity, and vibration sensor. However, the system may only use the temperature and humidity sensor of sensor board 50, and only the vibration sensor of sensor board 52, but all sensors on sensor board 54. Of course, various other combinations may be available depending on the application. Other embodiments may include a sensor board 50 having a different configuration with different sensors than sensor board 52 and/or sensor board 54.

Connectors 60 may be used to provide physical support to secure each SBU 50, 52, 54 to circuit board 10. Connectors 60 provide a plurality of conductors to deliver power from PSU 40 and to connect each sensor board 50, 52, 54 to a signaling bus for direct or indirect communication with processor (CPU) 20. One or more firmware modules may be used to provide a standard interface between one or more sensor boards 50, 52, 54 and processor 20, for example. In one embodiment, the signaling or service bus is a low-bandwidth bus implemented by a 2-conductor bus that substantially complies with a standard specification and protocol, such as the I2C (also denoted as I$^2$C) or SMBus specifications/protocols and is separate from the main system address/data bus used by processor 20 to communicate with memory 22, 24 and/or I/O 26. Of course, various other standard or proprietary signaling or service bus specifications may be used to communicate data between sensor boards 50, 52, 54 and processor 20. In one embodiment, MCU 200 includes logic to simulate more than one service bus protocol to provide compatibility with various main circuit boards 10. The appropriate service bus protocol may be automatically detected during operation, or may be selected by a jumper, switch, or firmware setting, for example.

Figure 2:
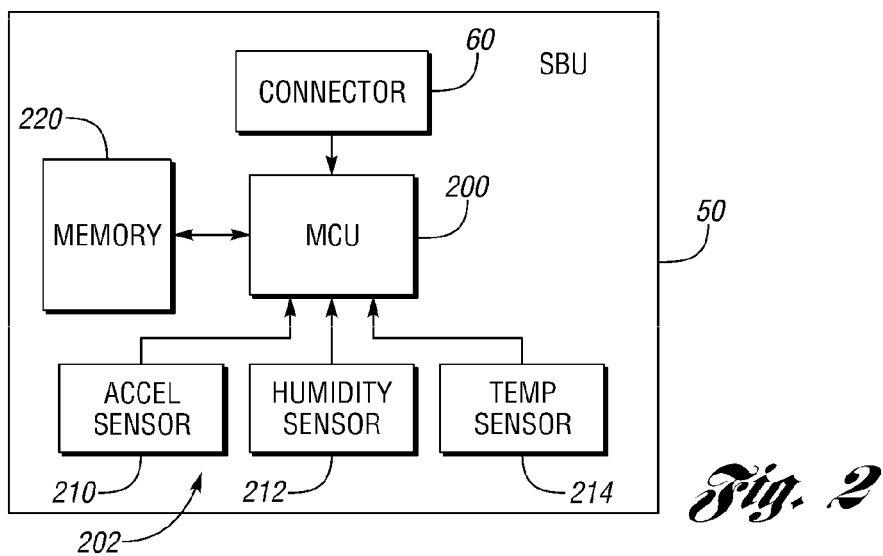
FIG. 2 is a block diagram illustrating a representative sensor board having at least one sensor in communication with a sensor controller having a single bus address according to embodiments of the present disclosure.

FIG. 2 is a block diagram illustrating a representative sensor board 50 for use in a system or method for monitoring operating conditions of computer server or network appliance according to the present disclosure. Sensor board 50 includes various components mounted on a substrate or board separate from main circuit board 10. For example, sensor board 50 may include a controller or micro-control unit (MCU) 200 in direct communication with one or more sensors 202, i.e. without using the signaling or service bus of circuit board 10. One or more sensors 202 may include an accelerometer 210, humidity sensor 212, temperature sensor 214. Other sensors may include a gyroscope, airflow sensor, enclosure intrusion sensor, and the like. Sensor board 50 may also include various sensor-specific circuitry or chips to provide analog-to-digital conversion (ADC)/sampling, circuit protection, buffering, etc. Sensor board 50 may also include volatile and/or persistent memory 220 in communication with MCU 200. A connector 60 is provided to removably secure sensor board 50 to a main circuit board and may be implemented by a standard board-to-board connector. In one embodiment, connector 60 is implemented by a surface mount compatible, dual row, vertical connector with a polarizing peg and provides up to 15 W of power. Sensor board 50 may also be hard-wired or soldered to circuit board 10 for some applications.

As shown in FIGS. 1 and 2, a system or method for monitoring operating conditions of a main circuit board 10 having a processor 20 and an associated signaling or service bus include a controller 200 in direct communication with at least one sensor 202 without using the signaling bus. Sensor board 50 (or controller 200) is assigned a single unique address on the signaling or service bus and selectively communicates sensor data from sensors 202 for receipt by processor 20. Controller 200 and at least one sensor 210, 212, 214 are mounted to a substrate or circuit board 50 separate from main circuit board 10. A connector 60 is mounted to substrate or circuit board 50 and is adapted to couple to a corresponding connector on main circuit board 10 so that controller 200 may selectively communicate with processor 20 using the signaling bus. In one embodiment, volatile or persistent memory 220 is also mounted on circuit board 50 and is directly accessible by controller 200 without using the signaling or service bus of main circuit board 10. As previously described, the service or signaling bus may be implemented by a two-conductor bus with controller 200 including logic for communicating with processor 20 using a corresponding two-conductor bus protocol, such as I2C or SMBus, for example.

In one embodiment, controller 200 includes logic for operating as a master device to selectively initiate communication or messages on the service bus to broadcast sensor data. Data communication may be initiated in response to a trigger event, such as an intrusion sensor detecting an enclosure intrusion, or a temperature sensor exceeding a corresponding threshold. Alternatively, or in combination, data communication may be initiated at selected intervals subject to service bus collision detection and arbitration, for example. Controller 200 may also be configured to operate as a slave device such that data is communicated only in response to a polling request by processor 20 or an associated firmware module on the signaling bus, for example. Processor 200 may include logic implemented in hardware and/or software for processing raw (or pre-processed/conditioned) sensor signals from sensors 200 and communicating associated results for receipt by processor 20 on circuit board 10 via the signaling or service bus. Raw sensor data may be processed using any of a number of processing strategies to detect trends or changes in sensor values, minimum/maximum values, averages, and other statistics, for example. Similarly, sensor raw data or processed data may be compared to a threshold with a status flag or indicator communicated to processor 20 when the sensor value crosses the threshold. In one embodiment, data from an accelerometer or vibration sensor is processed by controller 200 using a Fast Fourier Transform (FFT) to extract information associated with performance of one or more fans 42, 44, 46. The resulting vibration frequency signature and levels may be used to detect deteriorating performance and provide an associated message, alarm, or warning for additional processing by processor 20, for example.

The use of controller 200 to provide sensor data processing provides an additional layer of hardware abstraction to facilitate independent development of processor board 10 and sensor board 50. In addition, by processing raw sensor data associated with one or more sensors 202, controller 200 facilitates better utilization of the available bandwidth for the relatively narrow bandwidth signaling or service bus. Preprocessing of sensor data may reduce the number of collisions and associated overhead of service bus communications so that sensor data may be more easily and reliably communicated to processor 20 or other firmware modules on circuit board 10.

Figure 3:
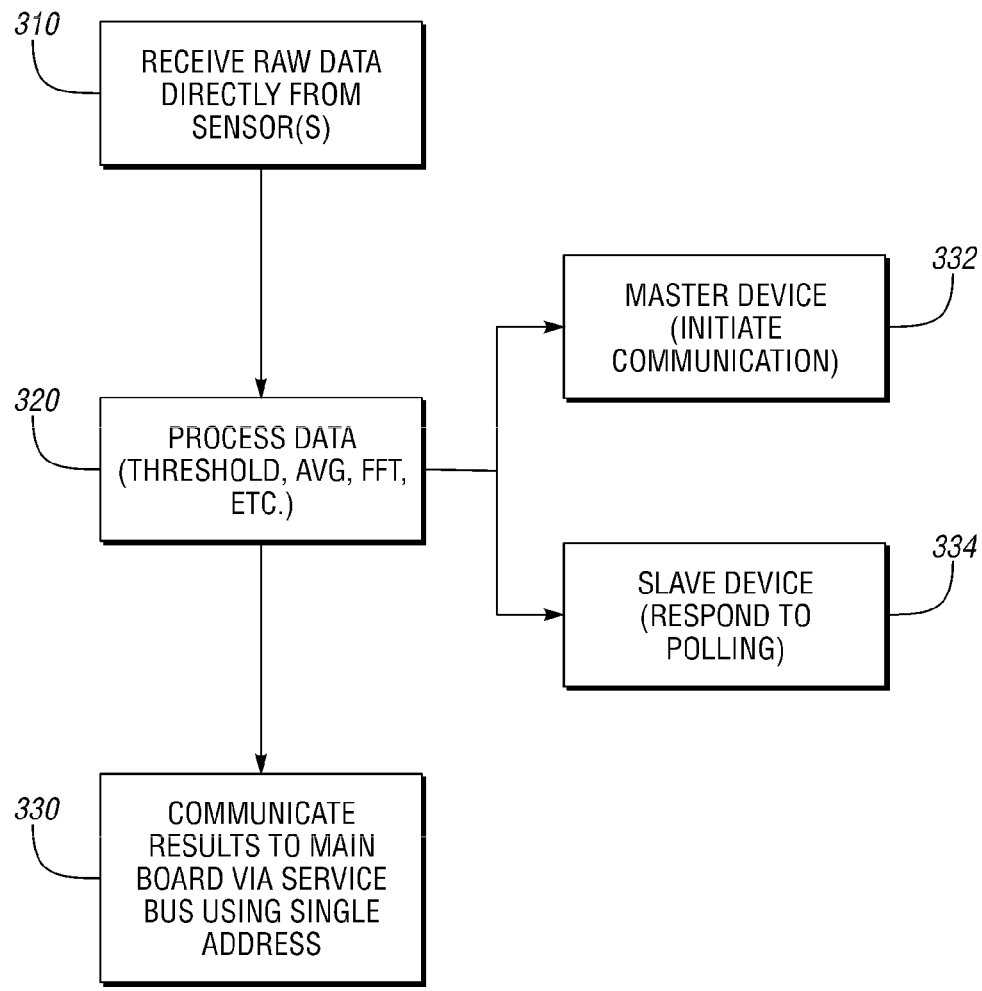
FIG. 3 is a block diagram illustrating operation of a system or method for monitoring operating conditions of a computer server or network appliance according to embodiments of the present disclosure.

FIG. 3 is a flow chart illustrating operation of a system or method for monitoring operating conditions of a computer system having a circuit board with a processor and associated signaling bus according to embodiments of the present disclosure. One of ordinary skill in the art will recognize that various functions illustrated in FIG. 3 may be optional and therefore may not be included in some embodiments depending on the particular implementation. Similarly, various functions may be performed by a controller or control logic implemented by hardware and/or software. The functions illustrated may be repeatedly performed although not explicitly illustrated. Similarly, some functions may be performed simultaneously, in a different order than shown, or omitted.

In one embodiment, a method for monitoring operating conditions of a computer system includes receiving raw data directly from one or more associated sensors as represented by block 310. The sensor data or signals may be received by a controller or micro-control unit mounted on the same board or substrate separate from the main circuit board (10, FIG. 1) without using the service or signaling bus of the main circuit board. The controller may include logic and/or instructions for processing the sensor data as represented by block 320. For example, sensor data processing may include comparing data to a corresponding threshold, computing an average, apply a transform function (such as an FFT), and the like with the results communicated to the main circuit board via the service bus using a single bus address associated with the sensor board/controller as represented by block 330. The method may include operation as a master device to initiate communication in response to a trigger event or at regular intervals as represented by block 332. Alternatively, the method may include operation as a slave device that does not initiate communication unless a corresponding request is received via the service or signaling bus as represented by block 334.

As such, various embodiments of the present disclosure provide a standardized approach to environmental and component monitoring in computer servers, network appliances, and similar devices through use of low-cost miniature sensor boards to facilitate sensor polling by standard, product-independent firmware modules to reduce design and schedule risks and enhance reliability, accessibility, and serviceability (RAS). Similarly, various embodiments create a layer of hardware abstraction by providing an intermediate microcontroller or processor to process raw sensor data and provide a single bus address for communicating raw or processed data from one or more sensors. Use of a single bus address for multiple sensors may increase overall sensor data availability to the main processor by reducing latency and overhead associated with collisions and arbitration of multiple master devices attempting to communicate on a narrow bandwidth service bus. Use of a standard protocol and board connector allows the sensor board to be mounted in various locations on a particular circuit board, or on one or more boards of a multi-board application. A standard protocol and connector also facilitates modular development of the sensor circuit board independent of the development cycle of the primary circuit boards used in the server or network appliance.

While one or more embodiments have been illustrated and described, it is not intended that these embodiments illustrate and describe all possible embodiments within the scope of the claims. Rather, the words used in the specification are words of description rather than limitation, and various changes may be made without departing from the spirit and scope of the disclosure. While various embodiments may have been described as providing advantages or being preferred over other embodiments or prior art implementations with respect to one or more desired characteristics, as one skilled in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described as less desirable than other embodiments or prior art implementations with respect to one or more characteristics are not outside the scope of the disclosure and may be desirable for particular applications or implementations.

What is claimed is:

1. A system for monitoring operating conditions of a main circuit board having a processor and associated 2-conductor signaling bus, the system comprising:
   at least one sensor;
   a controller in direct communication with the at least one sensor without using the 2-conductor signaling bus, the controller having an associated unique address on the signaling bus and selectively communicating sensor data on the signaling bus for receipt by the processor, wherein the at least one sensor and the controller are mounted to a substrate separate from the main circuit board, which is adapted for connection to the main circuit board to monitor operating conditions of the main circuit board, the substrate having a connector in communication with the controller and adapted for removably connecting the controller to a corresponding connecter mounted on the main circuit board in communication with the signaling bus.

2. The system of claim 1 wherein the system further comprises memory mounted on the substrate and directly accessible by the controller without using the signaling bus.

3. The system of claim 1 wherein the at least one sensor comprises a plurality of sensors.

4. The system of claim 3 wherein the plurality of sensors includes at least one accelerometer.

5. The system of claim 1 wherein the signaling bus comprises a 2-conductor bus and wherein the controller comprises logic for communicating with the processor using a standard 2-conductor bus protocol.

6. The system of claim 1 wherein the at least one sensor includes a plurality of sensors and wherein the controller includes logic for communicating data associated with each of the plurality of sensors to the processor on the main circuit board using the unique address on the signaling bus.

7. The system of claim 1 wherein the controller functions as a master device and initiates communication of sensor data on the signaling bus.

8. The system of claim 7 wherein the controller initiates communication of sensor data in response to a trigger event.

9. The system of claim 7 wherein the controller initiates communication of sensor data at a designated interval.

10. The system of claim 1 wherein the controller operates as a slave device and responds to requests for sensor data.

11. The system of claim 1 wherein the controller comprises logic for processing raw sensor data and communicating associated results to the processor on the main circuit board over the signaling bus.

12. A computer system comprising:
a main circuit board having a processor and associated 2-conductor signaling bus;
a sensor board secured to the main circuit board, the sensor board having a controller in communication with the 2-conductor signaling bus and accessible by a single unique 2-conductor signaling bus address, the sensor board including a controller in direct communication with at least one sensor and associated memory without using the 2-conductor signaling bus, the controller processing raw data from the at least one sensor and communicating associated results to the processor over the 2-conductor signaling bus;
wherein the sensor board is secured to the main circuit board using a standard board-to-board connector.

13. The computer system of claim 12 further comprising a plurality of sensor boards each secured to the main circuit board and communicating with the processor via a unique address on the 2-conductor signaling bus.

14. A method for monitoring operating conditions of a computer system having a circuit board with a processor and associated 2-conductor signaling bus, the method comprising:
communicating data from a plurality of sensors to the processor via an associated controller in direct communication with the sensors, the controller and sensors mounted on a substrate separate from the circuit board, wherein the controller is addressable via a single address on the 2-conductor signaling bus.

15. The method of claim 14 wherein communicating comprises communicating data in response to polling by the processor.

16. The method of claim 14 further comprising processing raw data from the sensors using the controller before communicating data via the signaling bus.

* * * * *